United States Patent
Jiang et al.

(10) Patent No.: US 10,430,659 B2
(45) Date of Patent: Oct. 1, 2019

(54) METHOD AND APPARATUS FOR URBAN ROAD RECOGNITION BASED ON LASER POINT CLOUD, STORAGE MEDIUM, AND DEVICE

(71) Applicant: Baidu Online Network Technology (Beijing) Co. Ltd., Beijing (CN)

(72) Inventors: Yu Jiang, Beijing (CN); Yang Yan, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 88 days.

(21) Appl. No.: 15/750,106

(22) PCT Filed: Dec. 8, 2015

(86) PCT No.: PCT/CN2015/096621
§ 371 (c)(1),
(2) Date: Feb. 2, 2018

(87) PCT Pub. No.: WO2017/020466
PCT Pub. Date: Feb. 9, 2017

(65) Prior Publication Data
US 2018/0225515 A1 Aug. 9, 2018

(30) Foreign Application Priority Data
Aug. 4, 2015 (CN) .......................... 2015 1 0472372

(51) Int. Cl.
*G06K 9/00* (2006.01)
*G06T 17/00* (2006.01)
(Continued)

(52) U.S. Cl.
CPC .......... *G06K 9/00704* (2013.01); *G06K 9/00* (2013.01); *G06K 9/00201* (2013.01);
(Continued)

(58) Field of Classification Search
CPC ... G06K 9/00–82; G06T 15/205; G06T 17/00; G06T 17/05; G06T 2207/10028
See application file for complete search history.

(56) References Cited

U.S. PATENT DOCUMENTS

| 8,665,263 B2 | 3/2014 | Yoshida et al. |
| 2010/0034426 A1 * | 2/2010 | Takiguchi ......... G01C 21/3602 382/106 |

(Continued)

FOREIGN PATENT DOCUMENTS

| CN | 102138163 A | 7/2011 |
| CN | 103390169 A * | 11/2013 |

(Continued)

OTHER PUBLICATIONS

Yang et al., "Hierarchical Extraction of Urban Objects from Mobile Laser Scanning Data", ISPRS Journal of Photogrammetry and Remote Sensing 2015, vol. 99, pp. 45-47.

(Continued)

*Primary Examiner* — Sean T Motsinger
(74) *Attorney, Agent, or Firm* — Knobbe Martens Olson & Bear LLP

(57) ABSTRACT

Embodiments of the present disclosure disclose a method and apparatus for urban road recognition based on a laser point cloud. The method comprises: constructing a corresponding road edge model according to the laser point cloud acquired by a laser sensor; determining a height of a mobile carrier provided with the laser sensor and constructing a corresponding road surface model based on the height and the laser point cloud; eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result. By estimating the height of (Continued)

the mobile carrier according to the laser point cloud and constructing a corresponding road surface model using the height, the efficiency and accuracy of constructing the road surface model are improved, thereby improving the efficiency and accuracy of recognizing corresponding objects.

18 Claims, 4 Drawing Sheets

(51) Int. Cl.
G06K 9/20 (2006.01)
G06K 9/46 (2006.01)
G06K 9/62 (2006.01)
G06T 15/20 (2011.01)
G06T 17/05 (2011.01)

(52) U.S. Cl.
CPC ..... *G06K 9/00798* (2013.01); *G06K 9/00805* (2013.01); *G06K 9/209* (2013.01); *G06K 9/4671* (2013.01); *G06K 9/6211* (2013.01); *G06K 9/6234* (2013.01); *G06K 9/6269* (2013.01); *G06T 15/205* (2013.01); *G06T 17/00* (2013.01); *G06T 17/05* (2013.01); *G06T 2207/10028* (2013.01)

(56) References Cited

U.S. PATENT DOCUMENTS

| | | | | |
|---|---|---|---|---|
| 2011/0164037 A1* | 7/2011 | Yoshida | .................. | G06T 15/08 345/419 |
| 2011/0310091 A2 | 12/2011 | Yoshida et al. | | |
| 2012/0281907 A1* | 11/2012 | Samples | ............ | G06K 9/00201 382/159 |
| 2013/0011013 A1* | 1/2013 | Takiguchi | .......... | G01C 21/3602 382/103 |
| 2017/0166209 A1* | 6/2017 | Mathissen | ............. | B60W 10/04 |
| 2017/0294026 A1* | 10/2017 | Choi | ........................ | G01S 17/42 |
| 2018/0058861 A1* | 3/2018 | Doria | ...................... | G01C 21/32 |
| 2018/0225515 A1* | 8/2018 | Jiang | ........................ | G06K 9/00 |
| 2019/0178989 A1* | 6/2019 | Tsai | ....................... | G01S 7/4802 |

FOREIGN PATENT DOCUMENTS

| | | |
|---|---|---|
| CN | 103390169 A | 11/2013 |
| CN | 103778429 A | 5/2014 |
| WO | 2008099915 A1 | 8/2008 |

OTHER PUBLICATIONS

Aijazi, et al., "Segmentation Based Classification of 4D Urban Point Clouds: A Super-Voxel Based Approach with Evaluation", Remote SEns. 2013, 5, 1624-1650; doi: 10.3390/rs5041624.

Chen, et al., "Gaussian-Process-Based Real-Time Ground Segmentation for Autonomous Land Vehicles", J Intell Robot Syst (2014) 76:563-582, DOI 10.1007/s10846-013-9889-4.

Douillard, et al., "On the Segmentation of 3D LIDAR Point Clouds", 2011 IEEE International Conference on Robotics and Automation, Shanghai International Conference Center, May 9-13, 2011, Shanghai, China, 8 pages.

Yang, et al., "Hierarchical extraction of urban objects from mobile laser scannin, Inc.g data", ISPRS Journal of Photogrammetry and Remote Sensing, Inc. (ISPRS). Published by Elsevier B.V., 2014, 13 pages.

Yuan, et al., "Road Detection and Corner Extraction Using High Definition Lidar", Information Technology Journal 9(5): 1022-1030, 2010, ISSN 1812-5638, 2010 Asian Network for Scientific Information.

Yang, et al. "Hierarchical extraction of urban objects from mobile laser scanning data", ISPRS Journal of Photogrammetry and Remote Sensing 99 (2015) 45-57.

International Search Report dated Apr. 27, 2016 for International Application No. PCT/CN2015/096621, 5 pages.

Written Opinion of the International Searching Authority dated Apr. 27, for International Application No. PCT/CN2015/096621, 3 pages.

* cited by examiner

```
┌─────────────────────────────────────────────────────┐
│ construct a corresponding road edge model based on the laser │──── 11
│ point cloud acquired by a laser sensor              │
└─────────────────────────────────────────────────────┘
                          ▼
┌─────────────────────────────────────────────────────┐
│ determine a height of a mobile carrier provided with the laser │──── 12
│ sensor and constructing a corresponding road surface model │
│ based on the height and the laser point cloud       │
└─────────────────────────────────────────────────────┘
                          ▼
┌─────────────────────────────────────────────────────┐
│ eliminate a road surface point cloud and a road edge point cloud │──── 13
│ in the laser point cloud according to the road edge model and │
│ the road surface model, segment a remaining laser point cloud │
│ using a point cloud segmentation algorithm, and recognize an │
│ object corresponding to a segmenting result         │
└─────────────────────────────────────────────────────┘
```

Fig. 1

```
┌─────────────────────────────────────────────────────┐
│ construct a corresponding road edge model according to a │──── 21
│ laser point cloud acquired by a laser sensor        │
└─────────────────────────────────────────────────────┘
                          ▼
┌─────────────────────────────────────────────────────┐
│ estimate a height of the mobile carrier using the laser point │──── 22
│ cloud close to a mobile carrier provided with the laser sensor, and │
│ with the height as an initial input threshold of a preset regression │
│ algorithm, construct a corresponding road surface model based │
│ on the laser point cloud                            │
└─────────────────────────────────────────────────────┘
                          ▼
┌─────────────────────────────────────────────────────┐
│ eliminate the road surface point cloud and the road edge point │──── 23
│ cloud in the laser point cloud according to the road edge model │
│ and the road surface model, segment the remaining laser point │
│ cloud using a point cloud segmentation algorithm, and identify │
│ an object corresponding to a segmenting result      │
└─────────────────────────────────────────────────────┘
```

Fig. 2

METHOD AND APPARATUS FOR URBAN ROAD RECOGNITION BASED ON LASER POINT CLOUD, STORAGE MEDIUM, AND DEVICE

CROSS REFERENCE TO RELATED APPLICATIONS

This patent application is the U.S. National Phase Application under 35 U.S.C. § 371 of International Application No. PCT/CN2015/096621, filed Dec. 8, 2015, designating the U.S. and published as WO 2017/020466 A1 on Feb. 9, 2017, which claims the priority of Chinese Patent Application Serial No. 201510472372.9 filed by Baidu Online Network Technology (Beijing) Co., Ltd on Aug. 4, 2015 as the applicant, entitled "Method and Apparatus for Urban Road Recognition Based on Laser Point Cloud," the entirety of each of which is incorporated herein by reference.

TECHNICAL FIELD

Embodiments of the present disclosure relate to the technical field of intelligent transportation, and more particularly to a method and apparatus for urban road recognition based on a laser point cloud, a storage medium, and a device.

BACKGROUND

Laser point cloud technology refers to a technology for sensing surrounding environment using a laser sensor installed in a mobile carrier (e.g., a vehicle) and processing the sensed information, thereby obtaining information about the environment where the mobile carrier is located, such as the lane it occupies, a road range, and a position of an obstacle.

In the prior art, road information is extracted mainly by constructing a road edge model based on a laser point cloud, constructing a road surface model corresponding to the laser point cloud by stochastically setting an initial input threshold of a regression algorithm, then obtaining a laser point cloud cluster corresponding to the laser point cloud, and obtaining an object corresponding to the laser point cloud cluster through point cloud segmentation and point cloud recognition.

In the scheme above, the road surface model corresponding to the laser point cloud is constructed by stochastically setting an initial input threshold. Constructing a road surface model in such a manner is not only inefficient, but also has relatively large errors; as a consequence, recognition of the object is rather inefficient with a relatively large error.

SUMMARY

An objective of the embodiments of the present disclosure is to provide a method and apparatus for urban road recognition based on a laser point cloud, a storage medium, and a device, so as to improve the efficiency and accuracy of road recognition.

In a first aspect, an embodiment of the present disclosure provides a method for urban road recognition based on a laser point cloud, comprising:

constructing a corresponding road edge model according to the laser point cloud acquired by a laser sensor;

determining a height of a mobile carrier provided with the laser sensor, and constructing a corresponding road surface model based on the height and the laser point cloud;

eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

In a second aspect, an embodiment of the present disclosure provides an apparatus for urban road recognition based on a laser point cloud, comprising:

a road edge modeling unit configured to construct a corresponding road edge model according to the laser point cloud acquired by a laser sensor;

a road surface model unit configured to determine a height of a mobile carrier provided with the laser sensor, and construct a corresponding road surface model based on the height and the laser point cloud;

a point cloud eliminating unit configured to eliminate a road surface point cloud and a road edge point cloud in the laser point cloud according to the road edge model and the road surface model;

a point cloud segmenting unit configured to segment a remaining laser point cloud using a point cloud segmentation algorithm; and an object recognizing unit configured to recognize an object corresponding to a segmenting result.

In a third aspect, an embodiment of the present disclosure provides one or more storage mediums containing computer-executable instructions which, when executed by a computer processor, perform an urban road recognition method based on a laser point cloud, the method comprising:

constructing a corresponding road edge model according to the laser point cloud acquired by a laser sensor;

determining a height of a mobile carrier provided with the laser sensor, and constructing a corresponding road surface model according to the height and the laser point cloud;

eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

In a fourth aspect, an embodiment of the present disclosure provides a device, comprising:

one or more processors;

a memory;

one or more programs stored in the memory, the one or more programs performing following operations when executed by the one or more processors:

constructing a corresponding road edge model according to the laser point cloud acquired by a laser sensor;

determining a height of a mobile carrier provided with the laser sensor, and constructing a corresponding road surface model based on the height and the laser point cloud;

eliminating a road surface point cloud and a road edge point cloud in the laser point cloud according to the road edge model and the road surface model, segmenting a remaining laser point cloud using a point cloud segmentation algorithm, and recognizing an object corresponding to.

In the technical solutions provided by the embodiments of the present disclosure, by estimating the height of the mobile carrier based on the laser point cloud and constructing the corresponding road surface model using the height, the construction efficiency and accuracy of the road surface model are improved, which in turn improves the efficiency and accuracy of object recognition.

BRIEF DESCRIPTION OF THE ACCOMPANYING DRAWINGS

Hereinafter, drawings used to describe the embodiments will be briefly introduced so as to explain the technical solutions in the embodiments of the present disclosure more clearly. Of course, the drawings described below are only some of the embodiments of the present disclosure. Those skilled in the art may modify and substitute these drawings without exercising an inventive effort.

FIG. 1 is a flow diagram of a method for urban road recognition based on a laser point cloud according to a first embodiment of the present disclosure;

FIG. 2 is a flow diagram of a method for urban road recognition based on a laser point cloud according to a second embodiment of the present disclosure;

DETAILED DESCRIPTION OF THE PREFERRED EMBODIMENTS

Figure 3:
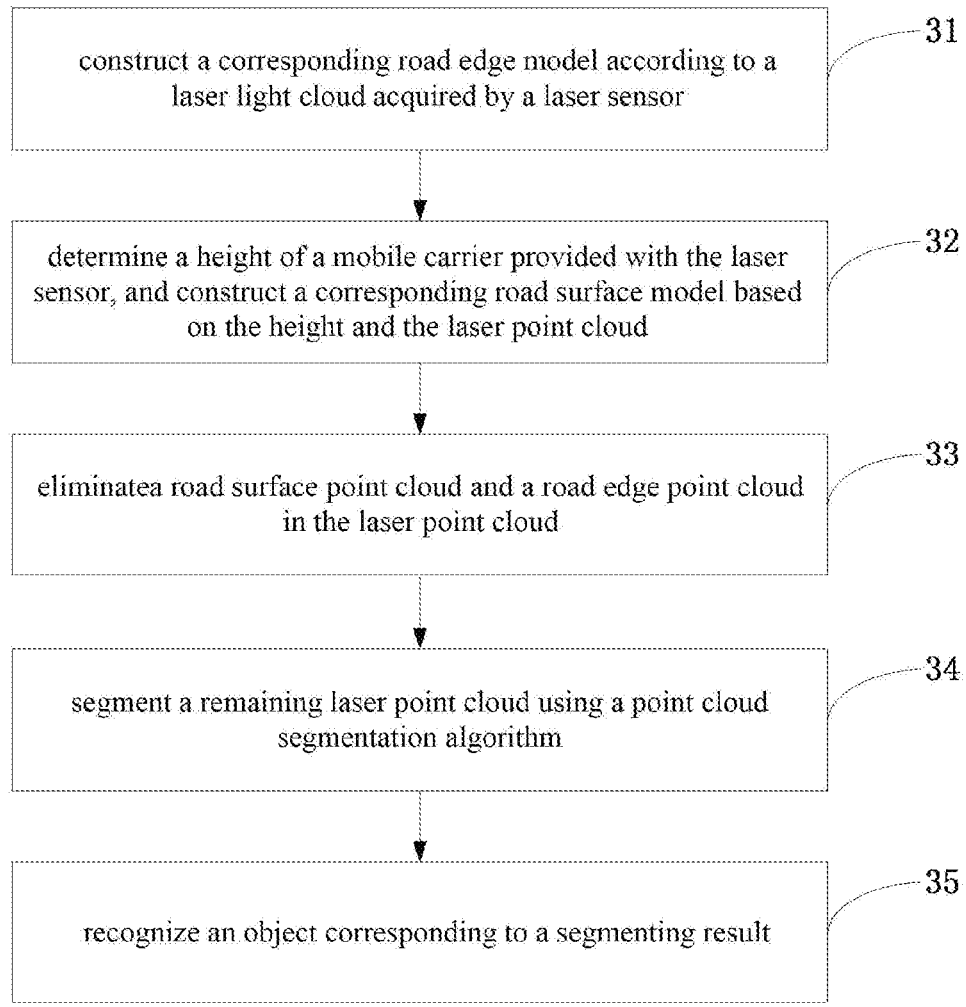
FIG. 3 is a flow diagram of a method for urban road recognition based on a laser point cloud according to a third embodiment of the present disclosure.

Hereinafter, the present disclosure will be described in further detail with reference to the accompanying drawings and embodiments. It will be appreciated that the preferred embodiments described herein are only for explaining the present disclosure, not for limiting the present disclosure. In addition, it should also be noted that for the ease of description, the drawings illustrate only part, not all of the structures related to the present disclosure.

First Embodiment

FIG. 1 is a flow diagram of a method for urban road recognition based on a laser point cloud according to a first embodiment of the present disclosure. The present embodiment is applicable to a scenario of recognizing an object on an urban road based on a laser point cloud. Referring to FIG. 1, the method for urban road recognition based on a laser point cloud as provided by the present embodiment specifically comprises:

S11: constructing a corresponding road edge model based on a laser point cloud acquired by a laser sensor.

In the present embodiment, the laser sensor may be a laser radar provided on a mobile carrier, the mobile carrier may generally be a vehicle, and the laser point cloud may be sets of characteristic points of the environment where the mobile carrier is located, including coordinates and reflectivity of the respective characteristic points, which reflectivity may be an integer ranging from 0 to 255.

Exemplarily, the laser radar acquires a laser point cloud. A GPS (Global Positioning System)/IMU (Inertial Measurement Unit) may be employed to convert the acquired laser point cloud to a world coordinate system, and register the laser point cloud under the world coordinate system into a dense point cloud. Specifically, the registration precision of the dense point cloud may be improved through a dynamic particle tree SLAM (Simultaneous Localization and Mapping) algorithm. Now, two kinds of original data for point cloud classification are obtained, i.e., a dense point cloud registered under the world coordinate system, and a sparse ordered point cloud with one frame as a unit.

In the present embodiment, a road edge refers to a side edge of a road. Exemplarily, after the dense point cloud and multiple frames of the sparse ordered point cloud are acquired, possible road edge points are obtained by processing the multiple frames of sparse ordered point cloud. The possible road edge points are subjected to three-dimensional spline curve fitting so as to construct a corresponding road edge model corresponding to the laser point cloud based on the multiple frames of sparse ordered point cloud.

S12: determining a height of a mobile carrier provided with the laser sensor, and constructing a corresponding road surface model based on the height and the laser point cloud.

In the present embodiment, a road surface refers to a top surface on a road, available for a vehicle to travel thereon. Exemplarily, the sparse ordered point cloud is subjected to regression processing to obtain a height of the mobile carrier. Next, with the height of the mobile carrier as an initial input threshold of a regression algorithm, each frame of the sparse ordered point cloud is subjected to regression processing to obtain a candidate road surface point cloud corresponding to the each frame of a sparse ordered point cloud. A candidate road surface point cloud corresponding to multiple consecutive frames of the sparse ordered point cloud are merged and subjected to a one-dimensional spline curve fitting along a direction perpendicular to the traveling track of the mobile carrier; spline equation parameters resulting from the fitting are stored. The road surface model corresponding to the laser point cloud is thereby obtained.

S13: eliminating a road surface point cloud and a road edge point cloud in the laser point cloud according to the road edge model and the road surface model, segmenting a remaining laser point cloud using a point cloud segmentation algorithm, and recognizing an object corresponding to the segmenting result.

In the present embodiment, the object corresponding to the laser point cloud may be an obstacle such as a pedestrian, a vehicle, a tree, or a building, may also be a road sign, or a landmark. Exemplarily, the road edge point cloud and the road surface point cloud in the dense point cloud obtained in step S11 are eliminated according to the road edge model and the road surface model. The remaining laser point cloud is clustered to obtain a substantially discrete laser point cloud cluster; the laser point cloud cluster is segmented into laser point cloud sub-clusters using a point cloud segmentation algorithm. After the segmented laser point cloud sub-clusters are obtained, each laser point cloud sub-cluster is recognized using a pre-trained support vector machine, thereby recognizing the object corresponding to the laser point cloud sub-cluster.

By estimating the height of the mobile carrier according to the laser point cloud and constructing a corresponding road surface model using the height, the method for urban road recognition based on a laser point cloud as provide by the present embodiment improves the construction efficiency and accuracy for the road surface model, thereby improving the efficiency and accuracy of recognizing the object corresponding to the laser point cloud.

Second Embodiment

Based on the embodiment above, the present embodiment provides a novel method for urban road recognition based on a laser point cloud, the method further limiting the approaches to construct the road edge model and the road surface model. FIG. 2 is a flow diagram of a method for urban road recognition based on the laser point cloud according to a second embodiment of the present disclosure.

With reference to FIG. 2, the method for urban road recognition based on a laser point cloud as provided in the present embodiment specifically comprises:

S21: constructing a corresponding road edge model according to a laser point cloud acquired by a laser sensor.

Optionally, constructing a corresponding road edge model according to a laser point cloud acquired by a laser sensor may specifically comprise: recognizing the laser point cloud using a corner point detection algorithm, to obtain road edge corner points corresponding to the laser point cloud; constructing the road edge model based on the obtained road edge corner points.

Exemplarily, each frame of the sparse ordered point cloud is processed to obtain a candidate road edge point. Specifically, each frame of the sparse ordered point cloud may include 32 lines. For each frame of the sparse ordered cloud point, data of each line of the frame is subjected to sliding window processing. A candidate window possibly including a road edge is detected through three characteristics (slope, density, reflectivity) of the laser point cloud. Candidate road edge corner points are obtained from the candidate window using a corner point detection algorithm; wrong candidate corner points are filtered out based on a priori knowledge such as a vehicle height. Next, candidate corner points derived from all lines of the frame are projected to an axis perpendicular to the traveling direction of the mobile carrier, the projected points are clustered, and then a road edge corner point corresponding to the frame of the sparse point cloud is obtained through a weighted Gaussian convoluted voting algorithm. After repeating the operation above to obtain the road edge corner points corresponding to each frame of the sparse point cloud, the road edge corner points corresponding to all sparse point clouds are converted to a world coordinate system. After they are fused, noise is removed using a statistical filtering technique, the data amount is reduced using a point cloud dilution technique, and the road edge is repaired using the Karman filtering technique along the travelling track of the mobile vehicle. Afterwards, unordered corner points are fitted into a three-dimensional spline curve to obtain the road edge model corresponding to the laser cloud points.

It needs to be noted that by first obtaining corner points corresponding to the laser point cloud using a corner point detection approach and then fitting the corner points to construct a road edge model, the present embodiment improves the accuracy of the road edge model when compared with the prior art of directly recognizing the road edge corresponding to the laser point cloud.

S22: estimating a height of the mobile carrier using the laser point cloud close to a mobile carrier provided with the laser sensor, and with the height as an initial input threshold of a preset regression algorithm, constructing a corresponding road surface model based on the laser point cloud.

Optionally, estimating a height of the mobile carrier using the laser point cloud close to a mobile carrier provided with the laser sensor may specifically comprise: projecting the laser point cloud to a polar grid map with the coordinates of the laser sensor as the origin; performing Ransac (Random Sample Consensus) regression on the projection grids corresponding to the laser point cloud close to the laser sensor to estimate the height of the laser sensor.

Exemplarily, a polar grid map with the coordinates of the mobile carrier as the origin is established; each point in a sparse point cloud frame is projected to the polar grid map. Ransac regression is performed on the projection grids corresponding to the laser point cloud close to the laser sensor to estimate the height of the laser sensor; and the estimated height of the laser sensor is used as the height of the mobile carrier.

Optionally, when the regression algorithm is a Gaussian process regression, with the height as the initial input threshold of the preset regression algorithm, constructing a corresponding road surface model based on the laser point cloud may specifically comprise: performing Gaussian process regression to the projection grid corresponding to each frame of the laser point cloud according to the initial input threshold to obtain a corresponding candidate road surface point cloud; performing merging and spline regression processing to the candidate surface point cloud to obtain the road surface model.

Exemplarily, with the height of the mobile carrier as an initial input threshold (i.e., a threshold selection seed) of the preset regression algorithm, each frame of the sparse ordered point cloud is subjected to regression processing to obtain a candidate road surface point cloud of each frame of the sparse ordered point cloud. A candidate road surface point cloud corresponding to multiple consecutive frames of the sparse ordered point cloud are merged and subjected to one-dimensional spline fitting along a direction perpendicular to the travelling track of the mobile carrier. The fitted spline equation parameters are stored. A complete approximate road surface model is then obtained.

S23: eliminating the road surface point cloud and the road edge point cloud in the laser point cloud according to the road edge model and the road surface model, segmenting the remaining laser point cloud using a point cloud segmentation algorithm, and identifying an object corresponding to the segmenting result.

By constructing a corresponding road surface model using the height of the mobile carrier as the initial input threshold of the Gaussian process regression, the method for urban road recognition based on a laser point cloud as provided in the present embodiment improves the construction efficiency and accuracy for the road surface model, and by constructing a road edge model through a corner point detection algorithm, the accuracy of the road edge model is improved, thereby improving the efficiency and accuracy of recognizing the object corresponding to the laser point cloud.

Third Embodiment

Based on the embodiments above, the present embodiment provides a further method for urban road recognition based on a laser point cloud, the method further limiting approaches of point cloud segmentation. FIG. 3 is a flow diagram of a method for urban road recognition based on a laser point cloud according to a third embodiment of the present disclosure. Referring to FIG. 3, the method for urban road recognition based on a laser light cloud as provided in the present embodiment specifically comprises:

S31: constructing a corresponding road edge model according to a laser light cloud acquired by a laser sensor.

S32: determining a height of a mobile carrier provided with the laser sensor, and constructing a corresponding road surface model based on the height and the laser point cloud.

S33: eliminating a road surface point cloud and a road edge point cloud in the laser point cloud.

Exemplarily, a mean grid map, a min grid map, and a max grid map corresponding to a dense point cloud under a world coordinate system are established. A threshold is selected to establish an undirected graph model with a slope between neighboring grids as a characteristic, to obtain two maximum blocks of communication areas as a candidate road surface. Road surface grids adjacent to the candidate road surface are then queried. A threshold is selected to obtain a road surface point cloud in the road surface grid, and the road surface point cloud is filtered out, i.e., eliminating the road surface point cloud and the road edge point cloud in the dense point cloud.

S34: segmenting a remaining laser point cloud using a point cloud segmentation algorithm.

Optionally, segmenting a remaining laser point cloud using a point cloud segmentation algorithm comprises:

A. clustering the remaining laser point cloud to obtain a corresponding laser point cloud cluster.

Exemplarily, the remaining laser point cloud may be subjected to Euler clustering to obtain a substantially discrete point cloud cluster.

B. establishing a supervoxel corresponding to the laser point cloud cluster.

Optionally, establishing a supervoxel corresponding to the laser point cluster specifically comprises: establishing the supervoxel corresponding to the laser point cloud cluster based on spatial coordinates and reflectivity corresponding to the laser point cloud cluster. Exemplarily, for each laser point cloud cluster, a supervoxel of the laser point cloud cluster is established based on the spatial coordinates and reflectivity of the laser point cloud cluster.

C. segmenting the supervoxel to obtain laser point cloud sub-clusters, and performing merge processing to the laser point cloud sub-clusters.

By obtaining a supervoxel corresponding to the laser point cloud cluster and segmenting the supervoxel to obtain laser point cloud sub-clusters, the present embodiment improves the efficiency and accuracy of point cloud segmentation compared with the prior method of directly segmenting the laser point cloud cluster. Particularly, the present embodiment avoids unsatisfactory point cloud segmentation effect of the prior point cloud segmentation method caused by adhesion between a road sign and a side fence when the mobile carrier is travelling on a highway.

Optionally, performing merge processing to the laser point cloud sub-clusters comprises: obtaining shape characteristics of the laser point cloud sub-clusters through a principal component analysis; and performing merge processing to the laser point cloud sub-clusters based on the obtained shape characteristics.

Exemplarily, each supervoxel is subjected to random walker segmentation to obtain transitional segmented laser point cloud sub-clusters; each laser point cloud sub-cluster is subjected to principal component analysis (PCA) to obtain a shape characteristic of the laser point cloud sub-cluster; neighboring laser point cloud sub-clusters with similar shape characteristics are merged to obtain a final point cloud segmentation result, e.g., merging two laser point cloud sub-clusters having the same shape in a vertical direction. By performing merge processing to the laser point cloud sub-clusters, the present embodiment avoids segmenting the same object into different laser point cloud sub-clusters, thereby enhancing the rationality of the point cloud segmentation.

S35: recognizing an object corresponding to a segmenting result.

Exemplarily, after the segmented point cloud clusters are obtained, each point cloud cluster is recognized using a pre-trained support vector machine, finally obtaining the objects corresponding to the laser point cloud.

The method for urban road recognition based on a laser point cloud as provided by an embodiment of the present disclosure can obtain the road edge equation and a road surface point cloud corresponding to the laser point cloud, and recognize urban road objects such as a road sign, a landmark, and an obstacle corresponding to the laser point cloud. These results may be used for producing a high-precision map, thereby enhancing the speed and precision of the high-precision map production.

Fourth Embodiment

Figure 4:
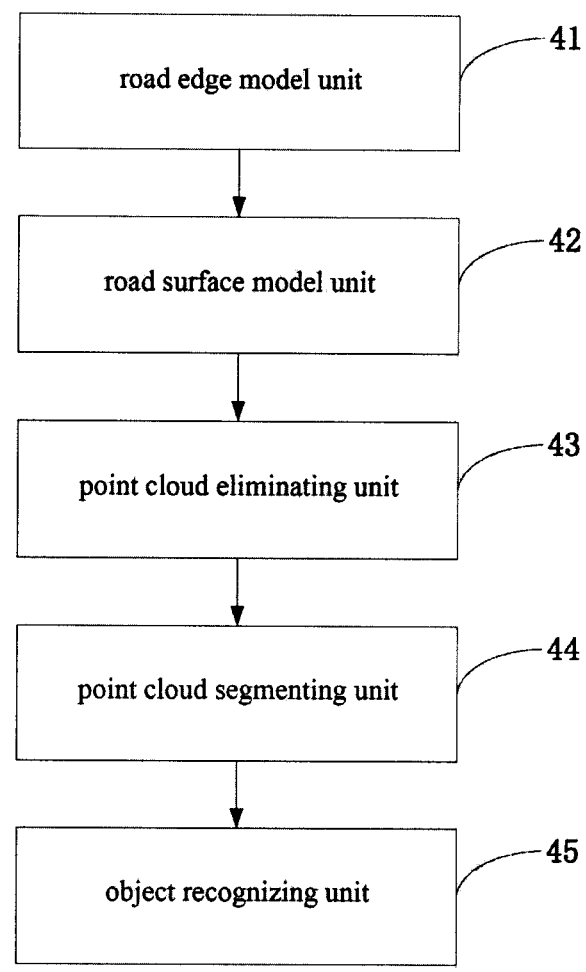
FIG. 4 is a structural diagram of an apparatus for urban road recognition based on a laser point cloud according to a fourth embodiment of the present disclosure.

FIG. 4 is a structural diagram of an apparatus for urban road recognition based on a laser point cloud according to a fourth embodiment of the present disclosure. The present embodiment is applicable to a scenario of recognizing an object on an urban road based on a laser point cloud. With reference to FIG. 4, the apparatus for urban road recognition based on a laser point cloud comprises:

a road edge modeling unit 41 configured to construct a corresponding road edge model according to the laser point cloud acquired by a laser sensor;

a road surface model unit 42 configured to determine a height of a mobile carrier provided with the laser sensor, and construct a corresponding road surface model based on the height and the laser point cloud;

a point cloud eliminating unit 43 configured to eliminate a road surface point cloud and a road edge point cloud in the laser point cloud according to the road edge model and the road surface model;

a point cloud segmenting unit 44 configured to segment a remaining laser point cloud using a point cloud segmentation algorithm; and an object recognizing unit 45 configured to recognize an object corresponding to a segmenting result.

Optionally, the road surface model 42 comprises:

a height estimating subunit configured to estimate the height of the mobile carrier according to the laser point cloud close to the mobile carrier provided with the laser sensor; and a road surface constructing subunit configured to construct a corresponding road surface model corresponding to the laser point cloud using the height as an initial input threshold value of a preset regression algorithm.

Optionally, the height estimating subunit is specifically configured to:

project the laser point cloud to a polar grid map with coordinates of the laser sensor as an origin;

perform Ransac regression to the projection grid map corresponding to the laser point louds close to the laser sensor to estimate the height of the laser sensor.

Optionally, when the regression algorithm is a Gaussian process regression, the road surface constructing subunit is specifically configured to:

perform Gaussian process regression to the projection grid corresponding to each frame of the laser point cloud according to the initial input threshold to obtain a corresponding candidate road surface point cloud; and perform merging and spline regression processing to the candidate surface point cloud to obtain the road surface model.

Optionally, the road edge model 41 comprises:

a corner point obtaining subunit configured to recognize the laser point cloud using a corner point detection algorithm to obtain road edge corner points corresponding to the laser point louds;

a road edge constructing subunit configured to construct the road edge model according to the obtained road edge corner points.

Optionally, the point cloud segmenting unit 44 comprises:

a point cloud cluster unit configured to cluster the remaining laser point cloud to obtain a corresponding laser point cloud cluster;

a supervoxel subunit configured to establish a supervoxel corresponding to the laser point cloud cluster;

a sub-point cloud subunit configured to segment the supervoxel to obtain laser point cloud sub-clusters; and a merge processing subunit configured to perform merge processing to the laser point cloud sub-clusters.

Optionally, the supervoxel subunit is specifically configured to establish a supervoxel corresponding to the laser point cloud cluster based on spatial coordinates and reflexivity corresponding to the laser point cloud cluster.

Optionally, the merge processing subunit is specifically configured to obtain shape characteristics of the laser point cloud sub-clusters through a principal component analysis; perform merge processing to the laser point cloud sub-clusters based on the obtained shape characteristics.

The product above may perform a method for urban road recognition based on a laser point cloud as provided in any embodiment of the present disclosure and has corresponding functional modules for and benefits from performing the methods. For technical details not described elaborately, they may refer to the method for urban road recognition based on a laser point cloud as provided in any embodiment of the present disclosure.

Fifth Embodiment

An embodiment of the present disclosure provides a storage medium containing computer-executable instructions which, when executed by a computer processor, are for performing an urban road recognition method based on a laser point cloud, the method comprising:

constructing a corresponding road edge model according to the laser point cloud acquired by a laser sensor;

determining a height of a mobile carrier provided with the laser sensor, and constructing a corresponding road surface model based on the height and the laser point cloud; and eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

When the storage medium performs the method, the determining a height of a mobile carrier provided with the laser sensor and constructing a corresponding road surface model based on the height and the laser point cloud may further specifically comprise:

estimating the height of the mobile carrier using the laser point cloud close to the mobile carrier provided with the laser sensor, and with the height as an initial input threshold of a preset regression algorithm, constructing a corresponding road surface model based on the laser point cloud.

When the storage medium performs the method, the estimating a height of the mobile carrier using the laser point cloud close to a mobile carrier provided with the laser sensor may further specifically comprise:

projecting the laser point cloud to a polar grid map with coordinates of the laser sensor as the origin;

performing Ransac regression to projection grids corresponding to the laser point cloud close to the laser sensor to estimate the height of the laser sensor.

When the storage medium performs the method, the regression algorithm is a Gaussian process regression, and with the height as an initial input threshold of a preset regression algorithm, the constructing a corresponding road surface model based on the laser point cloud may further specifically comprise:

performing Gaussian process regression to the projection grid corresponding to each frame of the laser point cloud according to the initial input threshold to obtain a corresponding candidate road surface point cloud; and performing merging and spline regression processing to the candidate surface point cloud to obtain the road surface model.

When the storage medium performs the method, the constructing a corresponding road edge model according to the laser point cloud acquired by a laser sensor may further specifically comprise:

recognizing the laser point cloud using a corner point detection algorithm, to obtain road edge corner points corresponding to the laser point cloud; and constructing the road edge model according to the obtained road edge corner points.

When the storage medium performs the method, the segmenting a remaining laser point cloud using a point cloud segmentation algorithm may further specifically comprise:

clustering the remaining laser point cloud to obtain a corresponding laser point cloud cluster;

establishing a supervoxel corresponding to the laser point cloud cluster; and segmenting the supervoxel to obtain laser point cloud sub-clusters, and performing merge processing to the laser point cloud sub-clusters.

When the storage medium performs the method, the establishing a supervoxel corresponding to the laser point cloud cluster may further specifically comprise:

establishing the supervoxel corresponding to the laser point cloud cluster based on spatial coordinates and reflectivity corresponding to the laser point cloud cluster.

When the storage medium performs the method, the performing merge processing to the laser point cloud sub-clusters may further specifically comprise:

obtaining shape characteristics of the laser point cloud sub-clusters through a principal component analysis; and performing merge processing to the laser point cloud sub-clusters based on the obtained shape characteristics.

Sixth Embodiment

Figure 5:
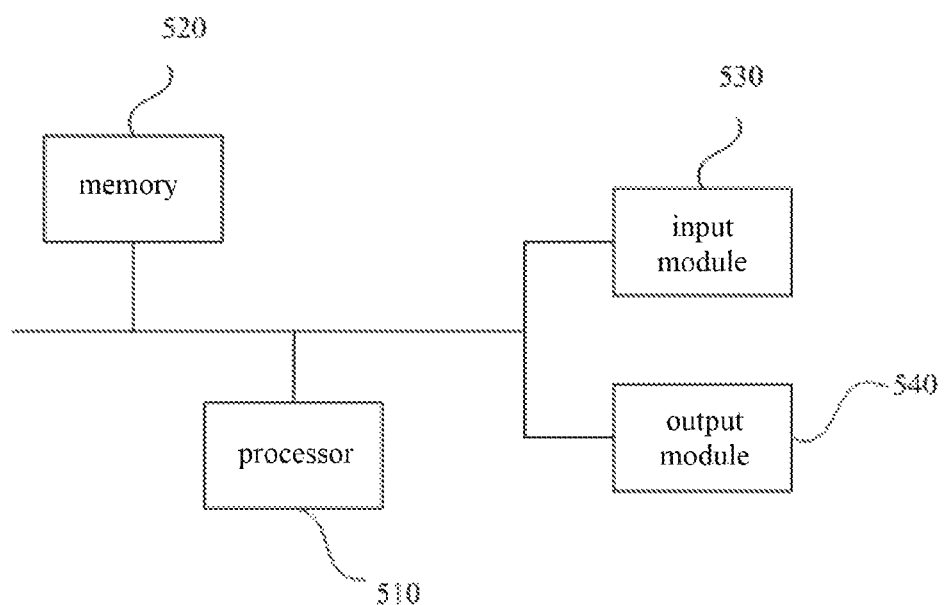
FIG. 5 is a structural diagram of a device hardware for performing a method for urban road recognition based on a laser point cloud according to a sixth embodiment of the present disclosure.

FIG. 5 is a schematic diagram of a device hardware structure for performing a method for urban road recognition based on a laser point cloud according to a sixth embodiment of the present disclosure. Referring to FIG. 5, the device comprises:

one or more processors 510, wherein one processor 510 is taken as an example in FIG. 5;

a memory 520; and one or more modules.

The device may further comprise: an input module 530 and an output module 540. The processor 510, memory 520, input module 530, and output module 540 in the device may be connected via a bus or other modes. Connection by a bus is used as an example in FIG. 5.

The memory 520 as a computer readable storage medium may be used to store software programs, computer-executable programs and modules, e.g., the program instructions/modules corresponding to the methods for urban road recognition based on a laser point cloud in the embodiments of the present disclosure and modules (e.g., the road edge model unit 41, road surface model unit 42, point cloud eliminating unit 43, point cloud segmenting unit 44, and object recognizing unit 45 in the apparatus for urban road recognition based on a laser point cloud as shown in FIG. 4). The processor performs various functional applications and data processing of the device by running the software programs, instructions, and modules stored in the memory 520, i.e., implementing the methods for urban road recognition based on a laser point cloud in the method embodiments above.

The memory 520 may comprise a program storage area and a data storage area, wherein the program storage area may store an operating system and an application required by at least one function; the data storage area may store data created based on the usage of a terminal device. Besides, the memory 520 may comprise a high speed random access memory, and may also comprise a non-volatile memory, e.g., at least one disk storage device, a flash memory device, or other non-volatile solid-state storage devices. In some embodiments, the memory 520 may further comprise memories remotely arranged to the processor 510. These remote memories may be connected to the terminal device via a network. Instances of the network include, but not limited to, the Internet, an enterprise intranet, a local area network, a mobile communications network, and a combination thereof.

The input module 530 may be configured to receive input digital or character information and generate key signal inputs associated with user settings and function controls of the terminal. The output module 540 may comprise a display screen and other display devices.

The one or more modules stored in the memory 520, when executed by one or more processors 510, perform the following operations:

constructing a corresponding road edge model according to the laser point cloud acquired by a laser sensor;

determining a height of a mobile carrier provided with the laser sensor, and constructing a corresponding road surface model based on the height and the laser point cloud;

eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

Further, the determining a height of a mobile carrier provided with the laser sensor and constructing a corresponding road surface model based on the height and the laser point cloud may comprise:

estimating the height of the mobile carrier using the laser point cloud close to the mobile carrier provided with the laser sensor, and with the height as an initial input threshold of a preset regression algorithm, constructing a corresponding road surface model based on the laser point cloud.

Further, the estimating a height of the mobile carrier using the laser point cloud close to a mobile carrier provided with the laser sensor may comprise:

projecting the laser point cloud to a polar grid map with coordinates of the laser sensor as an origin; and performing Ransac regression to projection grids corresponding to the laser point cloud close to the laser sensor to estimate the height of the laser sensor.

Further, the regression algorithm is a Gaussian process regression, and with the height as an initial input threshold of a preset regression algorithm, constructing a corresponding road surface model based on the laser point cloud may comprise:

performing Gaussian process regression to the projection grid corresponding to each frame of the laser point cloud according to the initial input threshold to obtain a corresponding candidate road surface point cloud; and performing merging and spline regression processing to the candidate surface point cloud to obtain the road surface model.

Further, the constructing a corresponding road edge model according to the laser point cloud acquired by a laser sensor may comprise:

recognizing the laser point cloud using a corner point detection algorithm, to obtain road edge corner points corresponding to the laser point cloud; and constructing the road edge model according to the obtained road edge corner points.

Further, the segmenting a remaining laser point cloud using a point cloud segmentation algorithm may comprise:

clustering the remaining laser point cloud to obtain a corresponding laser point cloud cluster;

establishing a supervoxel corresponding to the laser point cloud cluster; and segmenting the supervoxel to obtain laser point cloud sub-clusters, and performing merge processing to the laser point cloud sub-clusters.

Further, the establishing a supervoxel corresponding to the laser point cloud cluster may comprise:

establishing the supervoxel corresponding to the laser point cloud cluster based on spatial coordinates and reflectivity corresponding to the laser point cloud cluster.

Further, the performing merge processing to the laser point cloud sub-clusters may comprise:

obtaining shape characteristics of the laser point cloud sub-clusters through a principal component analysis; and performing merge processing to the laser point cloud sub-clusters based on the obtained shape characteristics.

Through the above description of the embodiments, those skilled in the art may clearly understand that the present disclosure may be implemented by software and necessary common hardware; naturally, it may also be implemented through hardware. However, in many cases, the former is preferred. Based on such understanding, the technical solution of the present disclosure essentially or the part contributing to the prior art may be embodied in a form of software product. The computer software product may be stored in a computer-readable storage medium, e.g., a floppy disk, a read-only memory (ROM), a random access memory (RAM), a flash disk (FLASH), a hard disk or an optical disk or the like of the computer, including several instructions for enabling a computer device (which may be a personal computer, a server or a network device, etc.) to perform the methods according to various embodiments.

It should be noted that in the embodiment of an apparatus for urban road recognition based on laser cloud points, the respective units and modules as included are only partitioned according to functional logics. However, the present disclosure is not limited to such a partition, as long as the corresponding functions can be implemented. In addition, specific names of respective functional units are only for distinguishing from one another, not for limiting the protection scope of the present disclosure.

What have been described above are only preferred embodiments of the present disclosure. However, the protection scope of the present disclosure is not limited thereto. Any variations or substitutions that may be easily envisaged by those skilled in the art familiar with this technical field should be covered within the protection scope of the present disclosure. Therefore, the protection scope of the present disclosure should be based on the protection scope of the claims.

What is claimed is:

1. A method for urban road recognition based on a laser point cloud, comprising:

constructing a corresponding road edge model according to the laser point cloud acquired by a laser sensor;

determining a height of a mobile carrier provided with the laser sensor and constructing a corresponding road surface model based on the height and the laser point cloud;

eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result, wherein the method is performed by one or more processors.

2. The method according to claim 1, wherein the determining a height of a mobile carrier provided with the laser sensor and constructing a corresponding road surface model based on the height and the laser point cloud comprises:

estimating the height of the mobile carrier using the laser point cloud close to the mobile carrier provided with the laser sensor, and with the height as an initial input threshold of a preset regression algorithm, constructing a corresponding road surface model based on the laser point cloud.

3. The method according to claim 2, wherein the estimating the height of the mobile carrier using the laser point cloud close to the mobile carrier provided with the laser sensor comprises:

projecting the laser point cloud to a polar grid map with coordinates of the laser sensor as an origin; and performing Ransac regression to projection grids corresponding to the laser point cloud close to the laser sensor to estimate the height of the laser sensor.

4. The method according to claim 2, wherein the regression algorithm is a Gaussian process regression, and with the height as an initial input threshold of a preset regression algorithm, constructing a corresponding road surface model based on the laser point cloud comprises:

performing Gaussian process regression to the projection grid corresponding to each frame of the laser point cloud according to the initial input threshold to obtain a corresponding candidate road surface point cloud; and performing merging and spline regression processing to the candidate surface point cloud to obtain the road surface model.

5. The method according to claim 1, wherein the constructing a corresponding road edge model according to the laser point cloud acquired by a laser sensor specifically comprises:

recognizing the laser point cloud using a corner point detection algorithm, to obtain road edge corner points corresponding to the laser point cloud; and constructing the road edge model according to the obtained road edge corner points.

6. The method according to claim 1, wherein the segmenting a remaining laser point cloud using a point cloud segmentation algorithm comprises:

clustering the remaining laser point cloud to obtain a corresponding laser point cloud cluster;

establishing a supervoxel corresponding to the laser point cloud cluster; and segmenting the supervoxel to obtain laser point cloud sub-clusters, and performing merge processing to the laser point cloud sub-clusters.

7. The method according to claim 6, wherein the establishing a supervoxel corresponding to the laser point cloud cluster specifically comprises:

establishing the supervoxel corresponding to the laser point cloud cluster based on spatial coordinates and reflectivity corresponding to the laser point cloud cluster.

8. The method according to claim 6, wherein the performing merge processing to the laser point cloud sub-clusters specifically comprises:

obtaining shape characteristics of the laser point cloud sub-clusters through a principal component analysis; and performing merge processing to the laser point cloud sub-clusters based on the obtained shape characteristics.

9. An apparatus for urban road recognition based on a laser point cloud, comprising:

a road edge modeling unit configured to construct a corresponding road edge model according to the laser point cloud acquired by a laser sensor;

a road surface model unit configured to determine a height of a mobile carrier provided with the laser sensor, and construct a corresponding road surface model based on the height and the laser point cloud;

a point cloud eliminating unit configured to eliminate a road surface point cloud and a road edge point cloud in the laser point cloud according to the road edge model and the road surface model;

a point cloud segmenting unit configured to segment a remaining laser point cloud using a point cloud segmentation algorithm; and an object recognizing unit configured to recognize an object corresponding to a segmenting result.

10. The apparatus according to claim 9, wherein the road surface model unit comprises:

a height estimating subunit configured to estimate the height of the mobile carrier using the laser point cloud close to the mobile carrier provided with the laser sensor; and a road surface constructing subunit configured to, with the height as an initial input threshold of a preset regression algorithm, construct a corresponding road surface model based on the laser point cloud.

11. The apparatus according to claim 10, wherein the height estimating subunit is specifically configured to:

project the laser point cloud to a polar grid map with coordinates of the laser sensor as the origin; and perform Ransac regression to projection grids corresponding to the laser point cloud close to the laser sensor to estimate the height of the laser sensor.

12. The apparatus according to claim 10, wherein the regression algorithm is a Gaussian process regression, the road surface constructing subunit is specifically configured to:

perform Gaussian process regression to the projection grid corresponding to each frame of the laser point cloud according to the initial input threshold to obtain a corresponding candidate road surface point cloud; and perform merging and spline regression processing to the candidate surface point cloud to obtain the road surface model.

13. The apparatus according to claim 9, wherein the road edge model unit comprises:

a corner point obtaining subunit configured to recognize the laser point cloud using a corner point detection algorithm to obtain road edge corner points corresponding to the laser point louds; and a road edge constructing subunit configured to construct the road edge model according to the obtained road edge corner points.

14. The apparatus according to claim 9, wherein the point cloud segmenting unit comprises:
a point cloud cluster unit configured to cluster the remaining laser point cloud to obtain a corresponding laser point cloud cluster;
a supervoxel subunit configured to establish a supervoxel corresponding to the laser point cloud cluster;
a sub-point cloud subunit configured to segment the supervoxel to obtain laser point cloud sub-clusters; and
a merge processing subunit configured to perform merge processing to the laser point cloud sub-clusters.

15. The apparatus according to claim 14, wherein the supervoxel subunit is specifically configured to:
establish a supervoxel corresponding to the laser point cloud cluster based on spatial coordinates and reflexivity corresponding to the laser point cloud cluster.

16. The apparatus according to claim 14, wherein the merge processing subunit is specifically configured to:
obtain shape characteristics of the laser point cloud sub-clusters through a principal component analysis; and
perform merge processing to the laser point cloud sub-clusters based on the obtained shape characteristics.

17. A non-transitory storage medium storing computer-executable instructions which, when being executed by a computer processor, cause the processor to perform an urban road recognition method based on a laser point cloud, the method comprising:

constructing a corresponding road edge model according to the laser point cloud acquired by a laser sensor;
determining a height of a mobile carrier provided with the laser sensor, and constructing a corresponding road surface model based on the height and the laser point cloud; and
eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

18. A device, comprising:
one or more processors;
a memory;
one or more programs stored in the memory, the one or more programs performing following operations when executed by the one or more processors:
constructing a corresponding road edge model according to the laser point cloud acquired by a laser sensor;
determining a height of a mobile carrier provided with the laser sensor, and constructing a corresponding road surface model based on the height and the laser point cloud; and
eliminating a road surface point cloud and a road edge point cloud in the laser point cloud according to the road edge model and the road surface model, segmenting a remaining laser point cloud using a point cloud segmentation algorithm, and recognizing an object corresponding to a segmenting result.

* * * * *